United States Patent [19]

Starchevich

[11] Patent Number: 5,363,092

[45] Date of Patent: Nov. 8, 1994

[54] PORTABLE SIGNALING DEVICE

[76] Inventor: Jovanka Starchevich, 138 Sullivan St., New York, N.Y. 10012

[21] Appl. No.: 67,557

[22] Filed: May 25, 1993

[51] Int. Cl.$^5$ ............................................. B60Q 7/00
[52] U.S. Cl. ................................ 340/473; 340/321; 340/332; 362/35; 362/284; 362/287; 362/269; 362/428; 40/514; 40/518
[58] Field of Search ...................... 340/473, 321, 332; 362/271, 282, 284, 287, 428, 269, 35; 40/514, 518

[56] References Cited

U.S. PATENT DOCUMENTS

| | | | |
|---|---|---|---|
| 1,003,745 | 9/1911 | Howe | 40/514 |
| 1,047,047 | 12/1912 | Gustavson | 40/514 |
| 1,289,095 | 12/1918 | Bessette | 40/518 |
| 1,308,914 | 7/1919 | Perkins | 40/518 |
| 1,669,659 | 5/1928 | Godley | 362/287 |
| 3,176,092 | 3/1965 | Lukasek . | |
| 3,252,235 | 5/1966 | Goessling et al. . | |
| 3,461,448 | 8/1969 | Kramer . | |
| 4,075,470 | 2/1978 | Moore | 362/287 |
| 4,364,104 | 12/1982 | Holahan et al. | 362/223 |
| 4,380,792 | 4/1983 | Terrell | 362/287 |
| 4,410,933 | 10/1983 | Blake et al. | 362/287 |
| 4,432,043 | 2/1984 | Yuen | 362/184 |
| 4,459,646 | 7/1984 | Drane | 362/188 |
| 4,486,819 | 12/1984 | Marcus et al. | 362/287 |
| 4,609,976 | 9/1986 | Geissler | 362/202 |
| 4,922,223 | 5/1990 | Prevot | 40/518 |
| 5,001,455 | 3/1991 | Starchevich | 340/332 |
| 5,095,414 | 3/1992 | Tinus | 362/284 |

FOREIGN PATENT DOCUMENTS 2664725 1/1992 France ..................... 70/514

*Primary Examiner*—John K. Peng
*Assistant Examiner*—Nina Tong
*Attorney, Agent, or Firm*—R. Neil Sudol; Henry D. Coleman

[57] ABSTRACT

A Portable signaling device comprises a housing having a first face and a second face, the housing being provided with a first opening in the first face and a second opening in the second face. The first opening is smaller than the second opening. A lamp is mounted to the housing for motion between a first position in which the lamp is oriented towards the first opening and a second position in which the lamp is oriented towards an interior of the housing. A shifting component is movably mounted to the housing and engageable with a lamp mount for operating on the mount to move the lamp between the first position and the second position. An electric power supply is provided in the housing. Contacts are provided in the housing for operatively connecting the power supply to the lamp at the first position and the second position only. At other positions of the lamp, the lamp is disconnected from the power supply and is therefore de-energized.

23 Claims, 5 Drawing Sheets

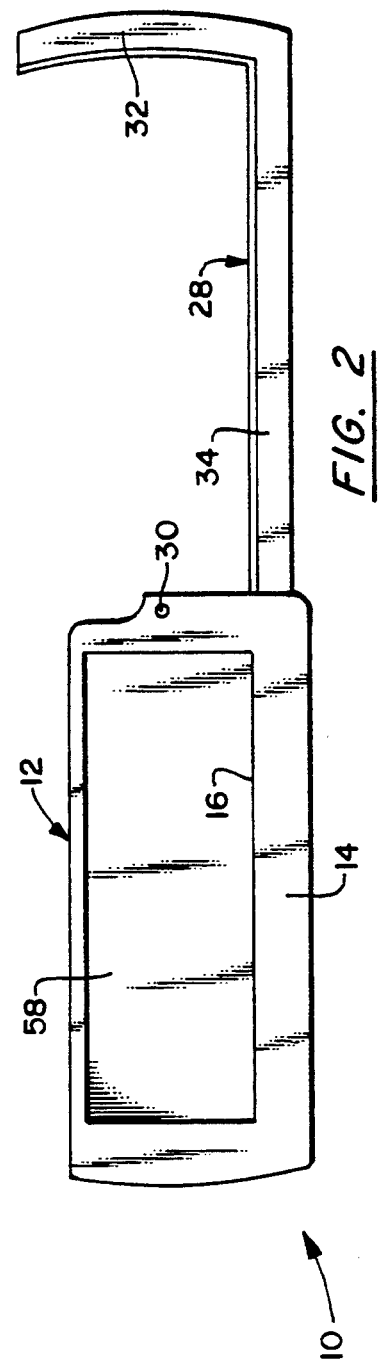
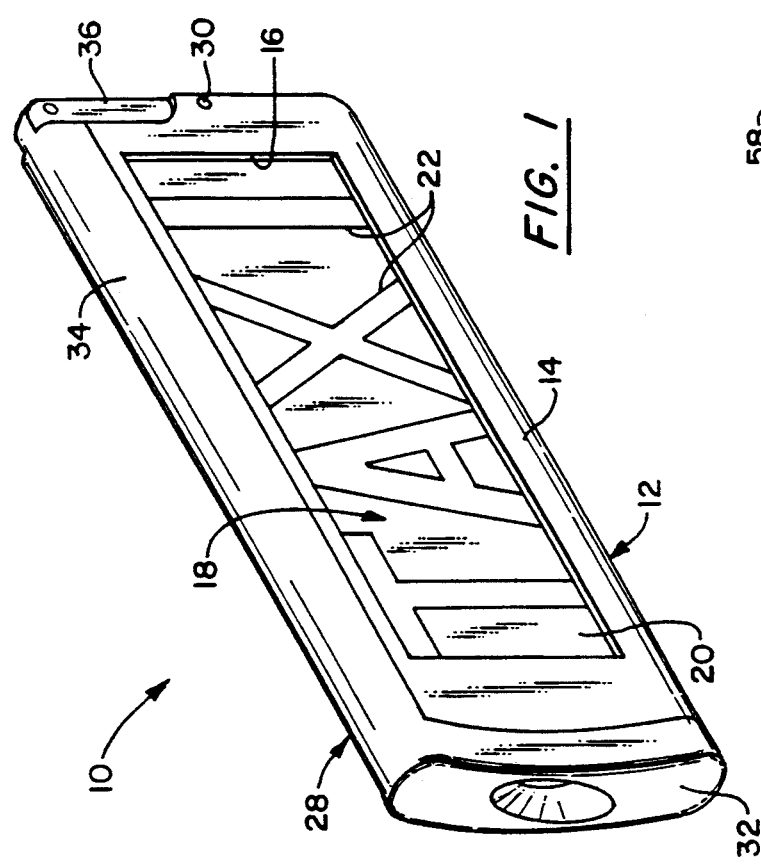

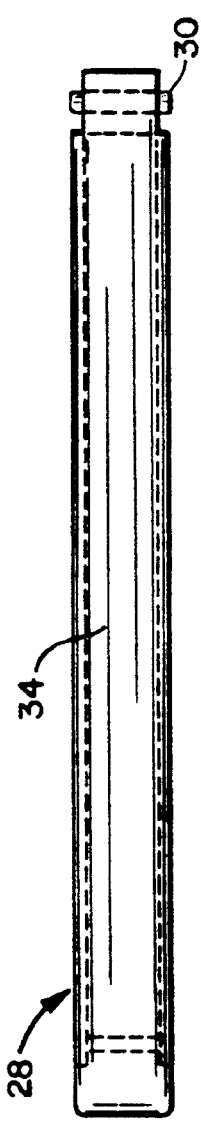
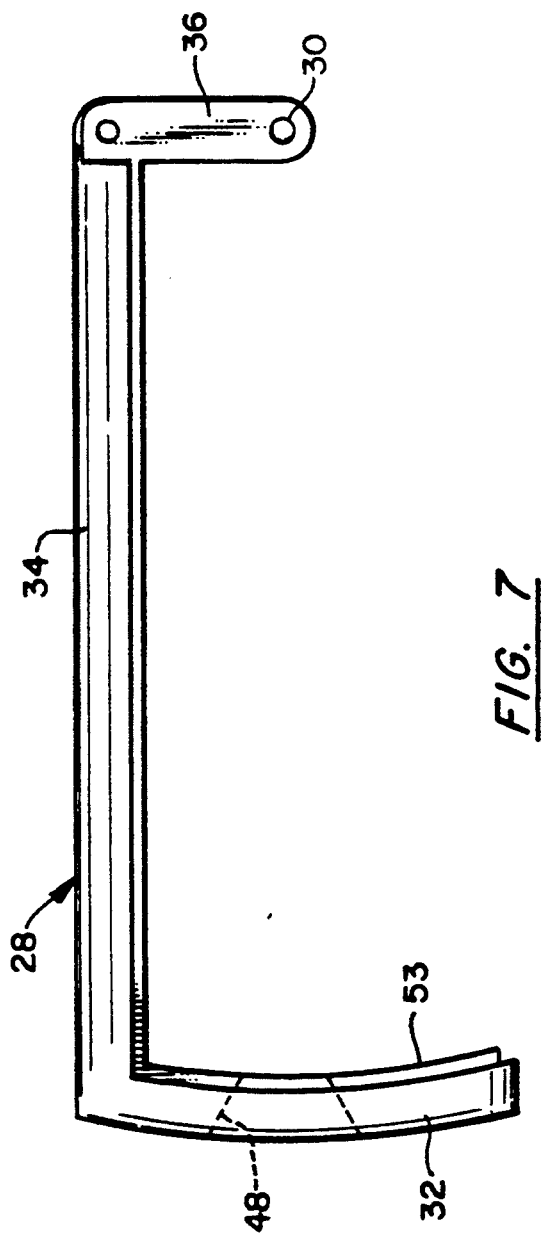
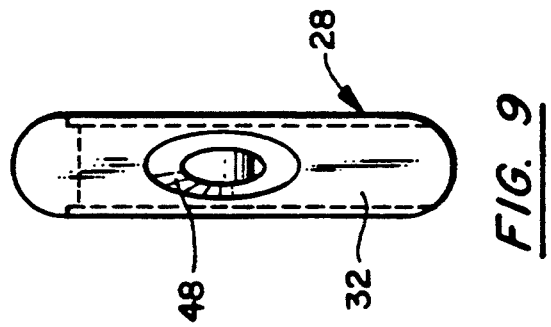

PORTABLE SIGNALING DEVICE

BACKGROUND OF THE INVENTION

This invention relates to a portable signaling device. More particularly, this invention relates to a portable signaling device which is alternatively utilizable as a flashlight.

Attracting a taxi cab is fraught with difficulties for both the taxi driver and the potential customer who is trying to attract the driver's attention. The taxi driver's concentration on the traffic is diverted in his or her attempts to locate a customer. The customer may be on the sidewalk with other pedestrians or in between parked cars or may otherwise be difficult to visually perceive.

In addition, there is a significant percentage of the population who are handicapped in their ability to attract the attention of a cab driver. Such people may be confined to wheelchairs or may use walkers and are accordingly unable to make quick and extended motions for signaling a cab driver. Many other people simply do not wish to be exposed to the undignified and often dangerous maneuvers required to attract a driver's attention.

U.S. Pat. No. 5,001,455 to Starchevich discloses a portable signaling device which provides a solution to the above problems. The signaling device is lightweight and displays the word "TAXI" in bright lettering capable of being spotted by taxi drivers under crowded traffic and pedestrian conditions.

OBJECTS OF THE INVENTION

An object of the present invention is to provide an improved portable signaling device of the kind disclosed in U.S. Pat. No. 5,001,455.

Another object of the present invention is to provide such an improved portable signaling device which can alternatively be used as a flashlight.

Another, more particular, object of the present invention is to provide such a portable signaling device which is easy to operate and requires only a modicum of manual dexterity.

A further particular object of the present invention is to provide such a device wherein different messages may be displayed.

An even more particular object of the present invention is to provide such a device wherein exchange of message signs is facilitated.

These and other objects of the present invention will be apparent from the drawings and detailed descriptions herein.

SUMMARY OF THE INVENTION

A portable signaling device comprises, in accordance with the present invention, a housing having a first face and a second face, the housing being provided with a first opening in the first face and a second opening in the second face. The first opening is smaller than the second opening. A lamp is mounted to the housing for motion between a first position in which the lamp is oriented towards the first opening and a second position in which the lamp is oriented towards an interior of the housing. A shifting component is movably mounted to the housing and engageable with a lamp mount for operating on the mount to move the lamp between the first position and the second position. An electric power supply is provided in the housing. Contacts are provided in the housing for operatively connecting the power supply to the lamp at the first position and the second position only. At other positions of the lamp, the lamp is disconnected from the power supply and is therefore de-energized.

Pursuant to further features of the present invention, the second opening defines a sign (e.g., the word "TAXI" or "HELP" or "STOP"). The housing is provided on an inner surface opposite the sign with a reflective surface, whereby light from the lamp in the second position shines out through the second opening to provide a visual signal. Means may be provided on the housing for changing the sign. For example, a plurality of different signs may be provided on an endless web mounted in the housing, knobs being rotatably mounted to the housing for revolving the web in the housing.

The portable signaling device may further comprise a light source (i.e., an additional lamp) and a switch disposed in the housing. The switch is operatively connected to the light source and the power supply for energizing the light source upon a pivoting of the first lamp to the second position by the shifting component.

A portable signaling device comprises, in accordance with a more particular conceptualization of the present invention, a housing and a handle member pivotably attached to the housing at a pivot point, the handle member including a circular portion having a center of curvature at the pivot point. A Lamp is rotatably mounted to the housing via a rotary carrier having an arcuate part drivingly engageable with the circular portion of the handle at least during a portion of a pivoting motion of the handle member about the pivot point. An electric power supply provided in the housing is operatively connected to the lamp at only a plurality of different angular positions of the carrier with respect to the housing.

Pursuant to another feature of the present invention, the handle is substantially L-shaped and has a first leg and a second leg connected to one another, the circular portion of the handle being disposed on the second leg.

Preferably, the second leg is provided with an aperture and the housing is formed with an opening such that the aperture is aligned with the opening in one of the angular positions of the lamp carrier, whereby light from the lamp exits the housing through the opening and the aperture and the device effectively operates as a flashlight.

The circular portion of the handle may include a partial annular surface on the second leg of the handle, the annular surface facing the housing. In that event, the carrier includes a circular disk portion which engages the annular surface on the second leg during the portion of the pivoting motion of the handle member about the pivot point.

According to another feature of the present invention, the carrier includes a recess in which the lamp is seated.

The present invention provides an improved portable signaling device of the kind disclosed in U.S. Pat. No. 5,001,455. The device is improved at least insofar as it is capable of operating alternatively as a flashlight, thus reducing the number or articles which one will carry, for example, in the glove compartment of an automobile or in a purse.

The handle part of a portable signaling device in accordance with the present invention folds around the housing, thereby rendering the device relatively compact for storage purposes. The handle unfolds to an extended configuration which increases the positions in which the sign can be held.

Because of the activation of the lamps by motion of the handle, rather than by an extraneous button, a portable signaling device in accordance with the present invention is easy to operate and requires only a modicum of manual dexterity.

By a simple maneuver, the sing may be changed, for example, from the word "TAXI" to the word "HELP" or vice versa.

BRIEF DESCRIPTION OF THE DRAWING

FIG. 1 is a perspective view of a portable signaling device in accordance with the present invention, showing a handle or L-shaped holder arm in a closed position on a housing.

FIG. 2 is a side elevational view of the portable signaling device of FIG. 1, showing the handle in an opened or extended position relative to the housing.

FIG. 7 is a side elevational view of the handle of FIGS. 1 and 2.

FIG. 8 is top view of the handle of FIGS. 1, 2 and 7.

FIG. 9 is front elevational view of the handle of FIGS. 1, 2, 7, and 8.

DETAILED DESCRIPTION

Figure 4:
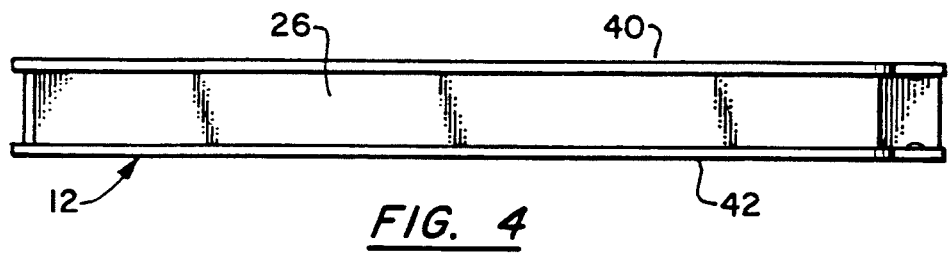
FIG. 4 is top view of the housing of FIGS. 1-3.

As illustrated in FIGS. 1-9, a portable signaling device 10 comprises a generally rectangular or flat prismatic housing 12 having a major face 14 provided with an opening or window 16 in which a web or sheet 18 is disposed. Sheet 18 has a background portion 20 in which a word such as "TAXI" or "HELP" or "STOP" is defined by openings or slots 22. Web or sheet 18 may be removed through a slot (not shown) in an upper face or side 26 of housing 12 (FIGS. 4-6) and replaced with a similar sheet (not shown) bearing a different word or sign (such as an arrow). Replacements sheets may be stored in housing 12, for example, in a separate chamber (not illustrated) provided along a face of housing 12 opposite major face 14.

A generally L-shaped handle or arm 28 (FIGS. 1 and 7-10) is pivotably attached to housing via a pivot pin 30. Handle 28 includes a slightly arcuate short leg 32 and a long leg 34 which are folded against housing 12 in a closed configuration of the portable signaling device illustrated in FIGS. 1 and 10. Handle 28 further includes, at an end of leg 34 opposite leg 32, a short extension 36 which receives pin 30. Handle 28 pivots about pin 30 from the closed position of FIGS. 1 and 10 to the opened or extended position illustrated in FIG. 2. As described in detail below, housing 12 is lit from within in the extended position of housing 12, whereby the word or sign in sheet 18 is illuminated for facilitating the signaling to a party at a distance.

Figure 5:
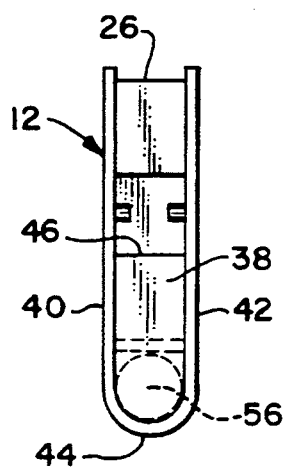
FIG. 5 is front elevational view of the housing of FIGS. 1-3.
Figure 6:
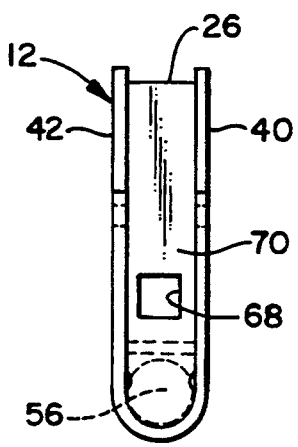
FIG. 6 is rear elevational view of the housing of FIGS. 1-3.

As illustrated in FIGS. 4 and 5, housing 12 is formed along upper face or side 26 and along a front face or side 38 with a pair of outwardly extending rims or flanges 40 and 42 which are joined to one another along a bight section 44 (FIG. 5). Rims 40 and 42 define a generally L-shaped groove which receives legs 32 and 34 of handle 28 in the closed position of the handle. Front face 38 is formed with an opening 46 (FIGS. 3 and 10) for enabling the shining of illumination from housing 12 in a forward direction so that the portable signaling device can function as a flashlight. To that end, leg 32 is provided with an opening or aperture 48 (FIGS. 1, 7, 9, 10) which is alignable with opening 46 in a flashlight mode of operation of the portable signaling device.

Thus, housing 12 is provided with a first opening 16 and a smaller second opening 46 which are used in a signaling mode of operation and a flashlight mode of operation, respectively.

Figure 10:
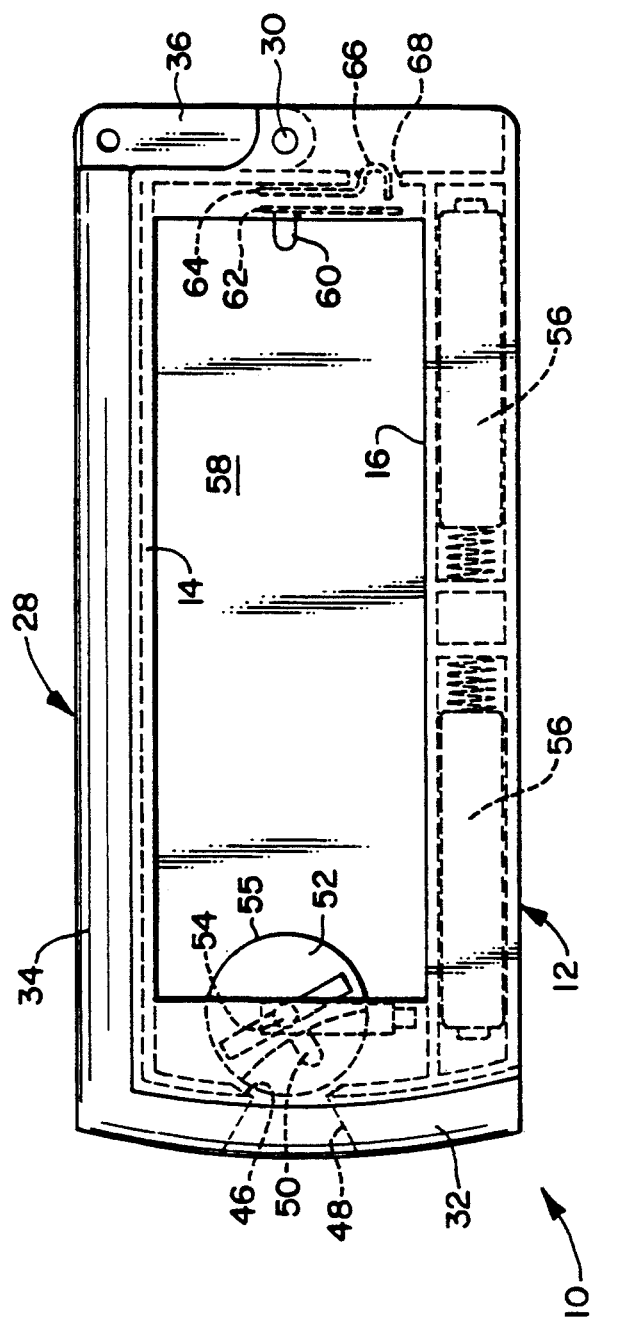
FIG. 10 is side elevational view of the portable signaling device of FIGS. 1 and 2, illustrating operative components in dashed lines.
Figure 14:
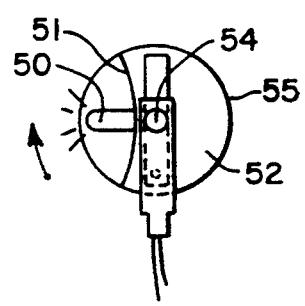
Figure 15:
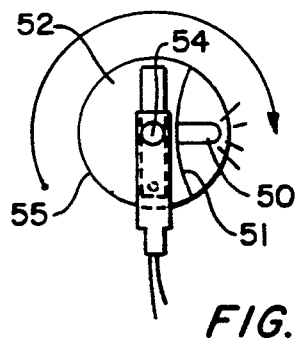

As illustrated in FIG. 10, a light source in the form of a lamp or bulb 50 is mounted to housing 12 via a disk-shaped carrier 52. Carrier 52 is pivotably connected to housing 12 via a pin 54, whereby lamp 50 is shiftable between a first position (FIG. 14) in which the lamp is oriented towards opening 46 in front face 38 and a second position (FIG. 15) in which the lamp is oriented towards an interior of housing 12. Carrier 52 includes a recess 51 in which lamp 50 is seated.

Figure 13:
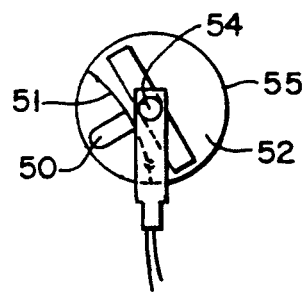
FIGS. 13-15 are side elevational views of an illumination lamp or bulb of the portable signaling device of FIGS. 1-10 or FIGS. 11 and 12, showing three different positions of the lamp.

The angular position of carrier or lamp mount 52 is changed by moving handle 28. A circular or annular inner side or surface 53 (FIG. 7) of leg 32 facing housing 12 has a center of curvature at pivot pin 30 and is frictionally engageable with an arcuate edge 55 of carrier 52 when that leg is disposed alongside front face 38 of housing 12. A pivoting of handle 28 from the closed position of FIGS. 1 and 10 thus shifts carrier 52 and lamp 50 initially from a disengaged or "off" position shown in FIGS. 10 and 13 to a flashlight position shown in FIG. 14. Further rotation of handle 28 shifts carrier 52 to the signaling position of FIG. 15. In that position, lamp 50 is oriented towards the interior of housing 12 and serves to illuminate sheet 18.

It is to be noted that as leg 32 shifts from a closed, "lights off" position (FIGS. 1 and 10) to a flashlight position in which lamp 50 is aligned with opening 46 (FIG. 14), aperture 48 in leg 32 becomes aligned with the opening 46, whereby light from lamp 50 exits the housing through opening 46 and aperture 48 and the device effectively operates as a flashlight.

Carrier 52 is provided with conventional brush contacts or other circuitry for operatively connecting lamp 50 to an electric power supply in the form of a pair of batteries 56 (FIGS. 3 and 10) disposed in housing 12. The electrical contacts are configured to connect lamp 50 to the power supply when lamp 50 and carrier 52 are in the flashlight position of FIG. 14 and the signaling position of FIG. 15. At other positions of the lamp, the lamp is disconnected from the power supply and is therefore deenergized.

Figure 3:
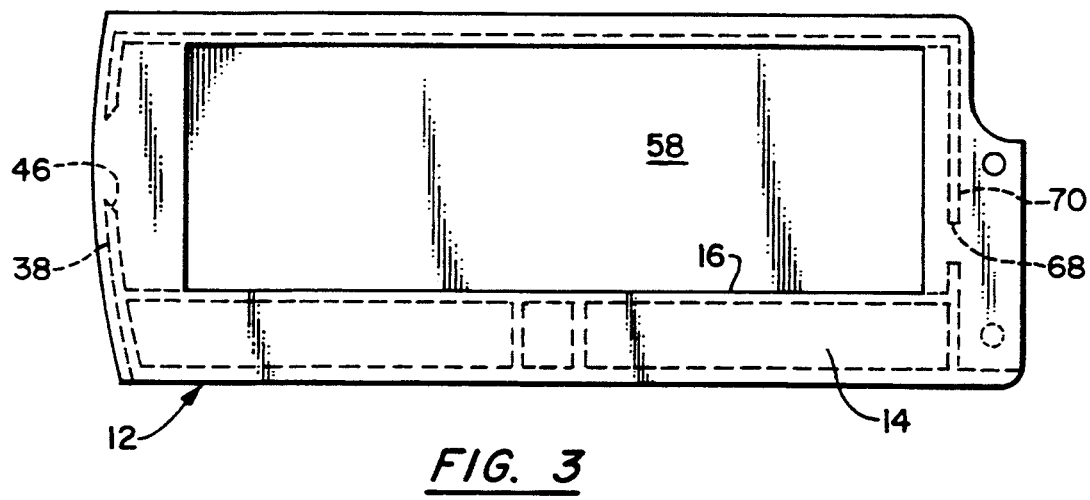
FIG. 3 is side elevational view of the housing of FIGS. 1 and 2.

FIGS. 2, 3 and 10 show housing 12 with sheet 18 (FIG. 1) removed. Housing 12 is provided on an inner surface 58 opposite opening or window 16 with a reflective surface, whereby light from lamp 50 in the signaling position of FIG. 15 shines out through opening 16 to provide a visual signal.

At an end of housing 12 opposite lamp 50 and carrier 52 is disposed a second light source in the form of a lamp or bulb 60 oriented towards the interior of housing 12. Bulb 60 is connectable to batteries 56 via a switch comprising a pair of contacts 62 and 64. Contact 64 is a leaf spring with a knobbed end portion 66 which projects through a hole 68 (FIGS. 3, 6, 10) in a rear face or side 70 of the housing 12 when handle 28 is in the closed position of FIGS. 1 and 10. Upon a swinging of handle 28 to the extended position of FIG. 2, extension 36 pushes knobbed portion 66 to shift contact 64 into conductive engagement with contact 62.

Figure 11:
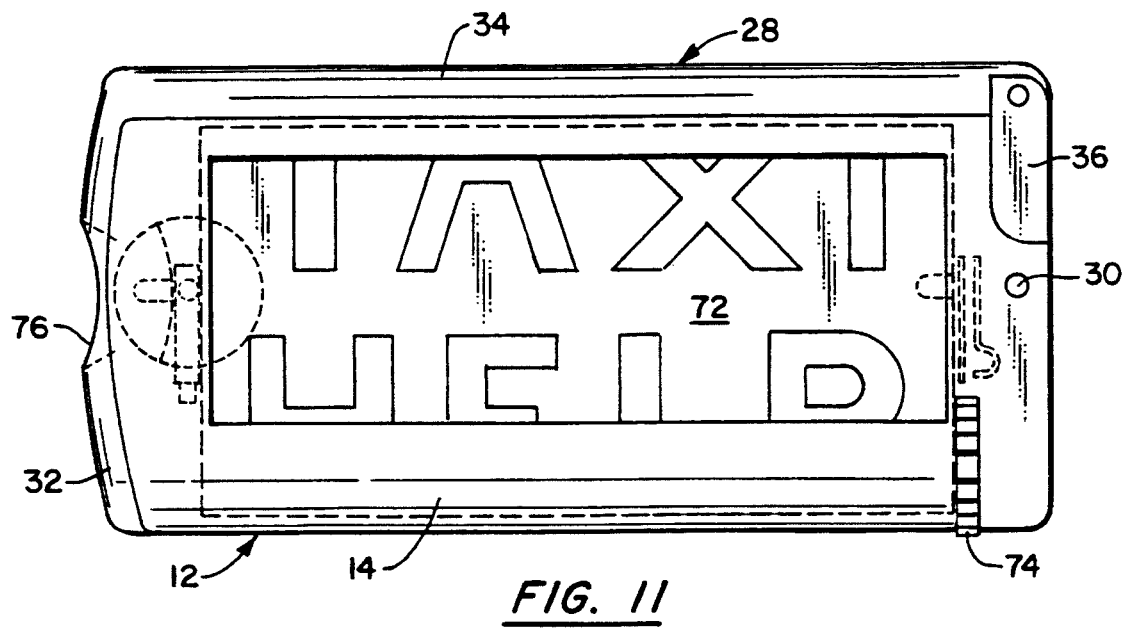
FIG. 11 is a side elevational view of a modified embodiment of a portable signaling device in accordance with the present invention.
Figure 12:
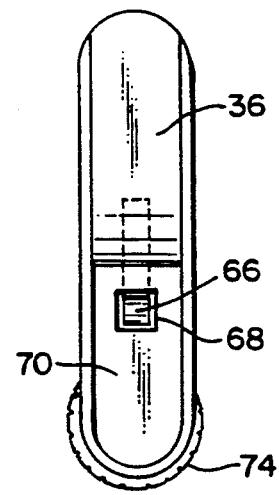
FIG. 12 is a rear elevational view of the portable signaling device of FIG. 11.

In FIGS. 11 and 12, the same reference numerals designate the same structural features as in the embodiment illustrated in FIGS. 1–10. FIGS. 11 and 12 illustrate a modified version of the portable signaling device wherein a plurality of different signs provided on an endless web 72 mounted in housing 12, at least one rotary knob 74 being rotatably mounted to housing 12 for revolving web 72 inside the housing to shift different signs in succession into alignment with opening or window 16. Leg 32 may be provided with a dip or depression 76 at the mouth of aperture 48. FIG. 11 shows L-shaped handle or arm 28 turned slightly about pivot pin 30 so that aperture 48 is aligned with opening 46 to permit shining of illumination from housing 12 in a forward direction so that the portable signaling device can function as a flashlight.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proferred by way of example to facilitate comprehension of the invention and should not be construed to limit the scope thereof.

What is claimed is:

1. A portable signaling device comprising:
   a housing;
   a handle member pivotably attached to said housing at a pivot point, said handle member including a partially circular portion having a center of curvature at said pivot point;
   a lamp;
   a rotary carrier rotatably mounted to said housing, said lamp being fixed to said carrier, said carrier having an arcuate part drivingly engageable with said circular portion at least during a portion of a pivoting motion of said handle member about said pivot point;
   an electric power supply in said housing; and
   means for operatively connecting said power supply to said lamp at only a plurality of different angular positions of said carrier with respect to said housing.

2. The device defined in claim 1 wherein said handle member has a first leg and a second leg connected to one another, said circular portion being disposed on said second leg.

3. The device defined in claim 2 wherein said second leg is provided with an aperture and said housing is formed with an opening, said aperture being aligned with said opening in one of said angular positions, whereby light from said lamp exits said housing through said opening and said aperture and the device effectively operates as a flashlight.

4. The device defined in claim 3 wherein said lamp faces an interior of said housing in another of said angular positions, said housing being provided on one side with an additional opening and on an opposite side with a reflective surface, whereby light from said lamp in said another of said angular positions shines out through said additional opening.

5. The device defined in claim 3 wherein said lamp faces an interior of said housing in another of said angular positions, said housing being provided on one side with a window forming a sign and on an opposite side with a reflective surface, whereby light from said lamp in said another of said angular positions shines out through said window to provide a visual signal.

6. The device defined in claim 3, further comprising a light source and a switch disposed in said housing, said switch being operatively connected to said light source and said power supply for energizing said light source upon a pivoting of said lamp to said another of said angular positions by said carrier and said handle member.

7. The device defined in claim 2 wherein said circular portion includes a surface on said second leg facing said housing.

8. The device defined in claim 7 wherein said carrier includes a circular disk portion which engages said surface on said second leg during said portion of the pivoting motion of said handle member about said pivot point.

9. The device defined in claim 7 wherein said carrier includes a recess in which said lamp is seated.

10. The device defined in claim 1 wherein said lamp faces an interior of said housing in one of said angular positions, said housing being provided on one side with a window forming a sign and on an opposite side with a reflective surface, whereby light from said lamp in said one of said angular positions shines out through said window to provide a visual signal.

11. The device defined in claim 10, further comprising means on said housing for changing said sign.

12. The device defined in claim 11, further comprising a plurality of different signs provided on an endless web mounted in said housing, said means for changing including means for revolving said web in said housing.

13. The device defined in claim 1 wherein said handle member is provided with an aperture and said housing is formed with an opening, said aperture being aligned with said opening in one of said angular positions, whereby light from said lamp exits said housing through said opening and said aperture and the device effectively operates as a flashlight.

14. The device defined in claim 1 wherein said lamp faces an interior of said housing in one of said angular positions, said housing being provided on one side with an opening and on an opposite side with a reflective surface, whereby light from said lamp in said one of said angular positions shines out through said opening.

15. The device defined in claim 1, further comprising a light source and a switch disposed in said housing, said switch being operatively connected to said light source and said power supply for energizing said light source upon a pivoting of said lamp to one of said angular positions by said carrier and said handle member.

16. A portable signaling device comprising:

a housing having a first face and a second face, said housing being provided with a first opening in said first face and a second opening in said second face, said first opening being smaller than said second opening;

a lamp;

mounting means for mounting said lamp to said housing for motion between a first position in which said lamp is oriented towards said first opening and a second position in which said lamp is oriented towards an interior of said housing;

shifting means movably mounted to said housing and engageable with said mounting means for operating on said mounting means to move said lamp between said first position and said second position;

an electric power supply in said housing; and means for operatively connecting said power supply to said lamp at said first position and said second position and for disconnecting said power supply from said lamp in a third position intermediate said first position and said second position so that said lamp is energized to generate light in said first position and said second position and is de-energized in said third position.

17. The device defined in claim 16 wherein said mounting means includes a rotary carrier rotatably mounted to said housing, said lamp being fixed to said carrier, said shifting means including a handle member pivotably attached to said housing at a pivot point, said handle member including a partially circular portion having a center of curvature at said pivot point, said carrier having an arcuate part drivingly engageable with said circular portion at least during a portion of a pivoting motion of said handle member about said pivot point.

18. The device defined in claim 17 wherein said carrier includes a recess in which said lamp is seated.

19. The device defined in claim 17 wherein said handle member lies partially adjacent said second face when said lamp is disposed in said first position, said handle member being provided with an aperture alignable with said first opening when said lamp is disposed in said first position.

20. The device defined in claim 16 wherein said second opening defines a sign and wherein said housing is provided on an inner surface opposite said second opening with a reflective surface, whereby light from said lamp in said second position shines out through said second opening to provide a visual signal.

21. The device defined in claim 20, further comprising means on said housing for changing said sign.

22. The device defined in claim 21, further comprising a plurality of different signs provided on an endless web mounted in said housing, said means for changing including means for revolving said web in said housing.

23. The device defined in claim 16, further comprising a light source and a switch disposed in said housing, said switch being operatively connected to said light source and said power supply for energizing said light source upon a pivoting of said lamp to said second position by said shifting means.

* * * * *